US010850961B2

(12) United States Patent
Tanaka et al.

(10) Patent No.: US 10,850,961 B2
(45) Date of Patent: Dec. 1, 2020

(54) FORKLIFT

(71) Applicant: KABUSHIKI KAISHA TOYOTA JIDOSHOKKI, Kariya (JP)

(72) Inventors: Minoru Tanaka, Nagakute (JP); Akinobu Fujii, Nagakute (JP); Yuuji Tsusaka, Nagakute (JP); Makoto Ichinose, Kariya (JP); Makoto Hayakawa, Kariya (JP)

(73) Assignee: KABUSHIKI KAISHA TOYOTA JIDOSHOKKI, Kariya (JP)

(*) Notice: Subject to any disclaimer, the term of this patent is extended or adjusted under 35 U.S.C. 154(b) by 392 days.

(21) Appl. No.: 15/572,809

(22) PCT Filed: Apr. 8, 2016

(86) PCT No.: PCT/JP2016/061596
§ 371 (c)(1),
(2) Date: Nov. 9, 2017

(87) PCT Pub. No.: WO2016/181733
PCT Pub. Date: Nov. 17, 2016

(65) Prior Publication Data
US 2018/0155169 A1    Jun. 7, 2018

(30) Foreign Application Priority Data
May 12, 2015    (JP) .................. 2015-097487

(51) Int. Cl.
*G06F 7/00*    (2006.01)
*B66F 9/16*    (2006.01)
(Continued)

(52) U.S. Cl.
CPC ................ *B66F 9/16* (2013.01); *B66F 9/063* (2013.01); *B66F 9/0755* (2013.01); *B66F 9/24* (2013.01);
(Continued)

(58) Field of Classification Search
CPC .......... B66F 9/16; B66F 9/063; B66F 9/0755; B66F 9/24; G01B 11/002; G01B 11/02;
(Continued)

(56) References Cited

U.S. PATENT DOCUMENTS 8,538,577 B2 * 9/2013 Bell ...................... B66F 9/0755
414/273
2007/0269299 A1    11/2007 Ross et al.
(Continued)

FOREIGN PATENT DOCUMENTS

BE        1018160 A3    6/2010
JP        59-057898 A    4/1984
(Continued)

OTHER PUBLICATIONS

English Translation of Written Opinion dated Jun. 14, 2016, issued by the International Search Authority in PCT/JP2016/061596 [PCT/ISA/237].
(Continued)

*Primary Examiner* — Isam A Alsomiri
*Assistant Examiner* — Kimberly Jasmin Ramsarup
(74) *Attorney, Agent, or Firm* — Sughrue Mion, PLLC

(57) ABSTRACT

A forklift includes: a fork 22, a moving mechanism configured to move the fork in a first direction; a laser sensor 20 mounted on the fork, configured to scan laser light in a second direction intersecting the first direction, and measure a distance from the laser sensor to a surrounding object based on reflection of the scanned laser light; and a processor configured to generate a three-dimensional range image within an emission range to which the laser light is emitted based on distance data acquired when the laser sensor scans the laser light in the second direction while the moving mechanism moves the fork in the first direction.

2 Claims, 8 Drawing Sheets

(51) Int. Cl.
- *G01B 11/02* (2006.01)
- *B66F 9/24* (2006.01)
- *G05D 1/02* (2020.01)
- *B66F 9/06* (2006.01)
- *G01B 11/00* (2006.01)
- *B66F 9/075* (2006.01)
- *G01S 17/06* (2006.01)
- *G01S 17/89* (2020.01)

(52) U.S. Cl.
CPC ............ *G01B 11/002* (2013.01); *G01B 11/02* (2013.01); *G01S 17/06* (2013.01); *G01S 17/89* (2013.01); *G05D 1/02* (2013.01); *G05D 1/024* (2013.01); *G05D 1/0225* (2013.01); G05D 2201/0216 (2013.01)

(58) Field of Classification Search
CPC .......... G01B 17/06; G01B 17/89; G01B 1/02; G01B 1/0225; G01B 1/024; G05D 2201/0216
See application file for complete search history.

(56) References Cited

U.S. PATENT DOCUMENTS

2008/0011554 A1  1/2008  Broesel et al.
2014/0277691 A1* 9/2014  Jacobus ............... G06Q 10/087
                                                    700/216

FOREIGN PATENT DOCUMENTS

| JP | 2-079398 U | 6/1990 |
| JP | 11-278799 A | 10/1999 |
| JP | 2005-089013 A | 4/2005 |
| WO | 2011/108944 A2 | 9/2011 |

OTHER PUBLICATIONS

International Search Report for PCT/JP2016/061596 dated Jun. 14, 2016 [PCT/ISA/210].
Written Opinion for PCT/JP2016/061596 dated Jun. 14, 2016 [PCT/ISA/237].
Communication dated Mar. 2, 2018, from European Patent Office in counterpart application No. 16792458.8.

* cited by examiner ically, the conventional tech-  # FORKLIFT

TECHNICAL FIELD

The present application is a National Stage of International Application No. PCT/JP2016/061596, filed on Apr. 8, 2016, which claims priority based on Japanese Patent Application No. 2015-097487 filed on May 12, 2015, the contents of all of which are hereby incorporated by reference in their entirety. The technique disclosed herein relates to a forklift.

BACKGROUND

In a load-lifting operation using a forklift, interferences between a fork and a pallet need to be avoided. In a forklift described in Japanese Patent Application Publication No. 2005-89013, a reflective optical sensor detects upper and lower ends of an opening of a pallet. Then, a clearance between an upper surface of a fork and the upper end of the opening of the pallet and a clearance between a lower surface of the fork and the lower end of the opening of the pallet are calculated, and a fork position is adjusted so that these clearances take appropriate values.

SUMMARY

To perform an accurate load-lifting operation with a forklift, identification accuracy of a pallet position needs to be improved. However, despite being capable of detecting a heightwise displacement of a pallet, the conventional technique had been unable to detect a lateral displacement and a displacement related to rotation.

The present description discloses a forklift that enables detection of a lateral positional displacement and a displacement related to rotation of a pallet using a simple configuration.

A forklift disclosed herein may comprise: a fork; a moving mechanism configured to move the fork in a first direction; a laser sensor mounted on the fork, configured to scan laser light in a second direction intersecting the first direction, and measure a distance from the laser sensor to a surrounding object based on reflected light of the scanned laser light; and a processor configured to generate a three-dimensional range image within an emission range to which the laser light is emitted based on distance data acquired when the laser sensor scans the laser light in the second direction while the moving mechanism moves the fork in the first direction.

In the above forklift, the laser sensor is mounted on the fork, and thus, when the fork moves in the first direction, the laser sensor moves in the first direction together therewith. Due to this, even if the laser sensor is of a one-dimensional scan type that scans the laser light in the second direction, the laser sensor can scan the laser light in the first and second directions by the motion of the fork in the first direction. Due to this, a three-dimensional range image can be acquired by using the laser sensor. This forklift is capable of acquiring the three-dimensional range image, so a positional displacement in a lateral direction and a displacement related to rotation of the pallet can be detected.

DETAILED DESCRIPTION

Some of the features of embodiments described below will be listed. It should be noted that the respective technical features described below are independent of one another, and useful solely or in combinations. The combinations thereof are not limited to those described in the claims as originally filed.

(Feature 1) In a forklift disclosed herein, a moving mechanism may comprise at least a lifting mechanism configured to move a fork up and down in a vertical direction, and a laser sensor may move up and down in the vertical direction as the fork moves up and down in the vertical direction. According to such a configuration, the lifting mechanism that moves the fork up and down in the vertical direction can be used to vertically scan light emitted from the laser sensor.

(Feature 2) In a forklift disclosed herein, the moving mechanism may comprise at least a tilting mechanism configured to tilt a distal end of the fork with respect to a proximal end of the fork, and the laser light emitted from the laser sensor may be scanned in the vertical direction as the distal end of the fork tilts with respect to the proximal end of the fork. According to such a configuration, the tilting mechanism that tilts the fork can be used to vertically scan the light emitted from the laser sensor.

(Feature 3) In a forklift disclosed herein, when a generated three-dimensional range image includes a pallet, a processor may be configured to identify a position, an orientation, and a width of a pallet based on the three-dimensional range image. According to such a configuration, the three-dimensional position, orientation, and width of the pallet are identified based on the three-dimensional range image generated from the distance data acquired by the laser sensor, so a positional displacement in a lateral direction and a displacement related to rotation of the pallet can accurately be detected.

(Feature 4) In a forklift disclosed herein, when the generated three-dimensional range image includes the pallet, the processor may be configured to selectively extract only distance data acquired from a front face of the pallet from the three-dimensional range image and identify the position, the orientation, and the width of the pallet based on a plane at the front face of the pallet identified based on the extracted distance data. According to such a configuration, the three-dimensional position, orientation, and width of the pallet are identified based on the distance data acquired from the front face of the pallet that was extracted from the three-dimensional range image generated from the distance data acquired by the laser sensor. Since positional information of the pallet is identified from the distance data acquired from the front face of the pallet, the positional displacement in the lateral direction and the displacement related to rotation of the pallet can accurately be detected.

First Embodiment

Figure 1:
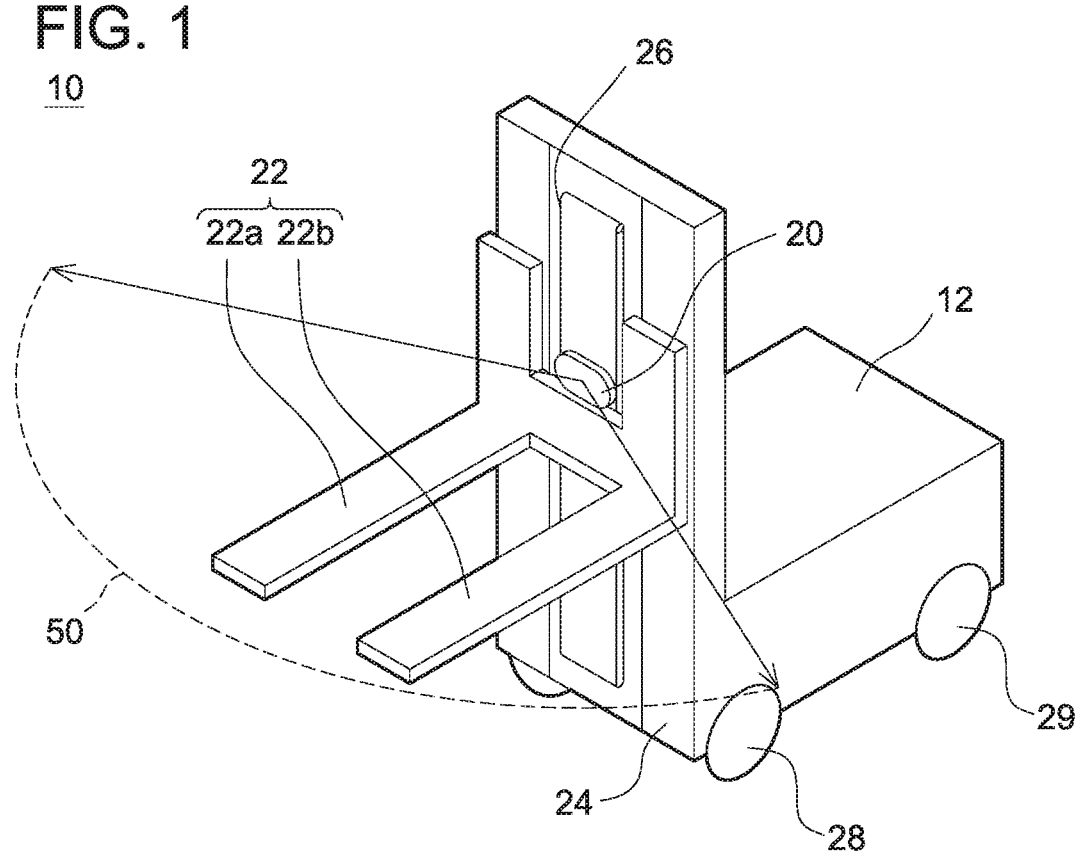
FIG. 1 is a perspective view showing a schematic configuration of a forklift of an embodiment.

With reference to the drawings, a forklift 10 of the present embodiment will be described. As shown in FIG. 1, the forklift 10 is an unmanned forklift, and includes a vehicle body 12, a mast 24, a fork 22, a lift chain 26, a laser sensor 20, and a controller 30.

The vehicle body 12 is provided with a front wheel 28 and a rear wheel 29 at each of its lateral surfaces. The front wheels 28 and the rear wheels 29 are supported rotatably on the vehicle body 12. One of the rear wheels 29 is connected to a driving motor that is not shown, and is configured to be driven to rotate by the driving motor. Further, the rear wheel 29 connected to the driving motor is also connected to a steering device that is not shown, and an orientation of the wheel is adjusted by the steering device. The other of the rear wheels 29 is a caster wheel, and is rotated and steered by following motions of the vehicle body 12. The controller 30 controls the driving motor and the steering device to allow the vehicle body 12 to run on a road and to change a moving direction of the vehicle body 12.

The mast 24 is a post mounted to a front surface of the vehicle body 12, and its axis extends in a vertical direction. The fork 22 is mounted to the mast 24 by being able to move in the vertical direction. Further, the fork 22 is configured capable of swinging with respect to the mast 24 by a tilting mechanism that is not shown. The fork 22 includes a pair of tines 22a, 22b. The tines 22a, 22b are disposed at positions spaced apart from each other in a right-and-left direction of the vehicle body 12, and extend forward of the vehicle body 12 from a mast 24 side. The lift chain 26 is disposed on the mast 24, and is engaged with the fork 22. When the lift chain 26 is driven by a fork lifting device 40 (shown in FIG. 3), the fork 22 is lifted and lowered according to a motion of the lift chain 26. A position of the fork 22 in the vertical direction can be identified by a driving amount of the fork lifting device 40.

Figure 2:
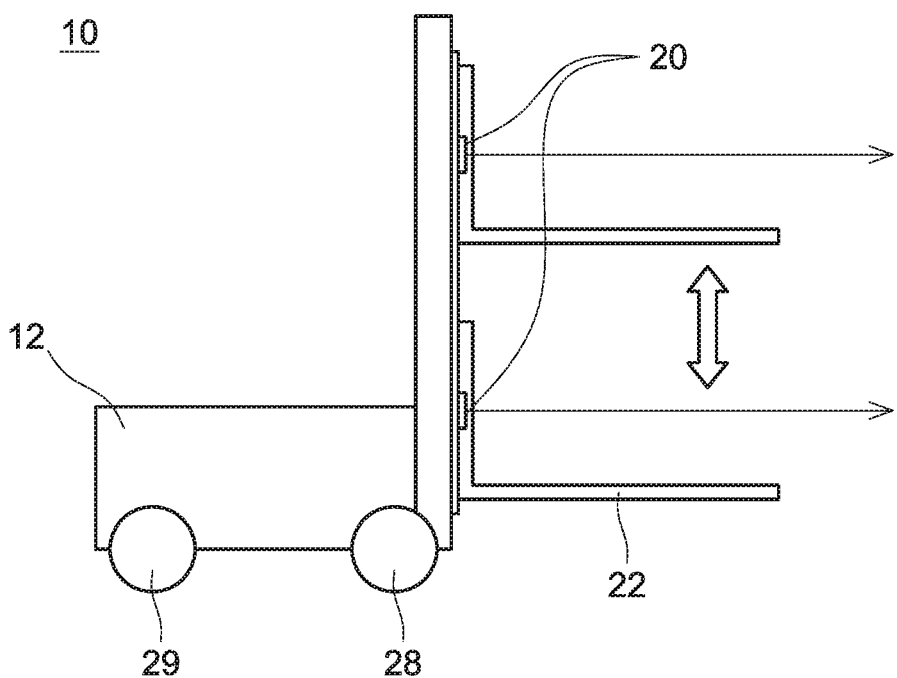
FIG. 2 is a diagram schematically showing a state in which laser light is scanned by the forklift of the embodiment.

The laser sensor 20 is mounted to the fork 22, and is lifted and lowered in the vertical direction together with the fork 22. A position to which the laser sensor 20 is mounted is between the tine 22a and the tine 22b, and on a backward side (on a vehicle body 12 side) relative to a backrest surface of the fork 22. The laser sensor 20 is a one-dimensional scanning-type laser sensor that scans the laser light in one direction (the horizontal direction in the present embodiment). The laser sensor 20 emits the laser light, and measures a distance to its surrounding object using reflection of the emitted laser light. Since the laser sensor 20 moves up and down according to an up and down motion of the fork 22, a heightwise position of the laser light emitted from the laser sensor 20 changes according to the motion. In the present embodiment, as shown in FIG. 2, the laser sensor 20 emits the laser light to a region 50 (see FIG. 1) having a predetermined angular range and set forward of the forklift 10, while lifting and lowering in the vertical direction. Due to this, the laser light emitted from the laser sensor 20 is scanned in the horizontal direction and in a height direction (two-dimensionally), and distance data 41 of a range set forward of the forklift 10 is thereby acquired. Three-dimensional distance data acquired by the laser sensor 20 is inputted into the controller 30 (see FIG. 3).

It should be noted that, UTM-30LX made by HOKUYO AUTOMATIC CO. LTD, LMS100 made by SICK AG, or the like may for example be used as the laser sensor 20.

The controller 30 is constituted of a microprocessor provided with a CPU and the like. The controller 30 is installed in the vehicle body 12. The controller 30 is connected to the laser sensor 20, the driving motor that drives the one of the rear wheels 29, the steering device that adjusts the steering angle of the rear wheel 29 connected to the driving motor, the fork lifting device that lifts and lowers the fork 22, and the like as aforementioned, and controls operations thereof.

Figure 3:
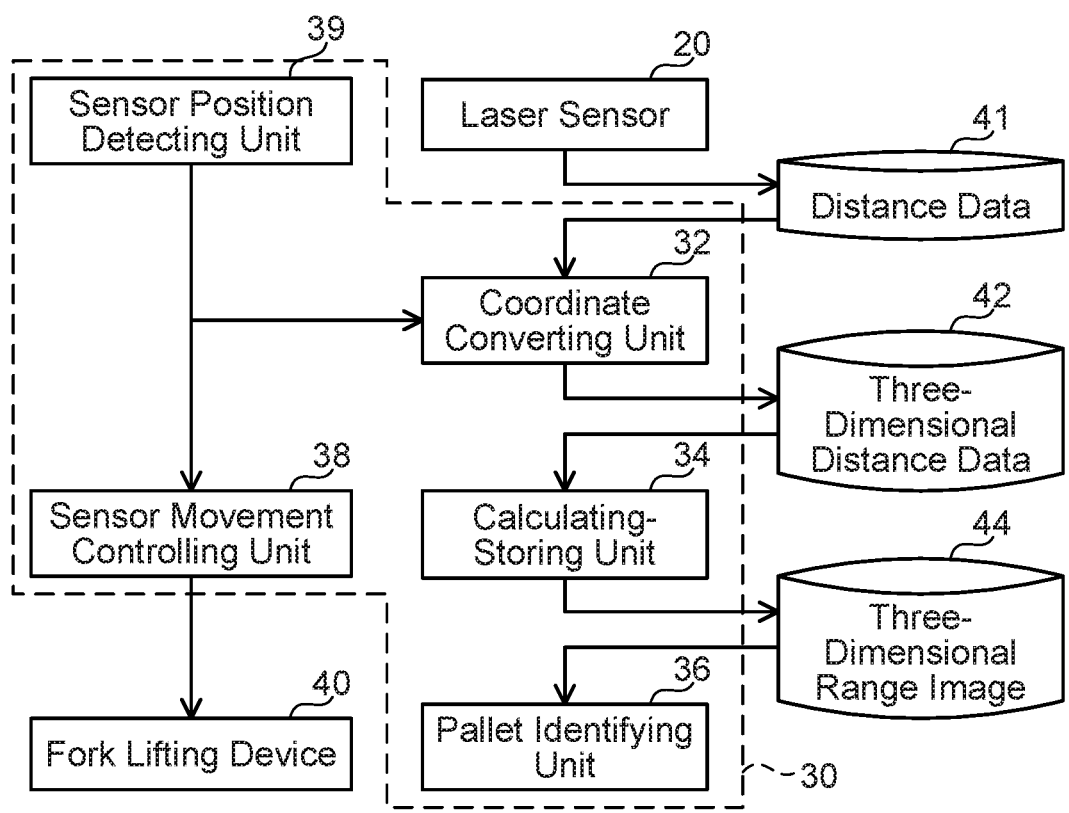
FIG. 3 is a block diagram showing a control system of the forklift of the embodiment.

That is, the controller 30 performs a process to lift and lower the laser sensor 20, a process to perform coordinate conversion on the distance data, and a process to store coordinate-converted three-dimensional distance data to generate a three-dimensional range image by executing a program stored in a memory. Further, the controller 30 performs a process to identify a position, an orientation, and a width of a pallet 100 based on the three-dimensional range image, and the like. That is, as shown in FIG. 3, the controller 30 functions as a coordinate converting unit 32, a calculating-storing unit 34, a pallet identifying unit 36, a sensor movement controlling unit 38, and a sensor position detecting unit 39. A three-dimensional range image 44 of a surrounding object in a space set forward of the forklift 10 is generated by the controller 30 functioning as the aforementioned respective units 32 to 39, and further the position, orientation, and width of the pallet 100 are identified from the generated three-dimensional range image 44. Details of the respective units 32 to 39 will be described together with processes executed by the controller 30 described later.

Figure 4:
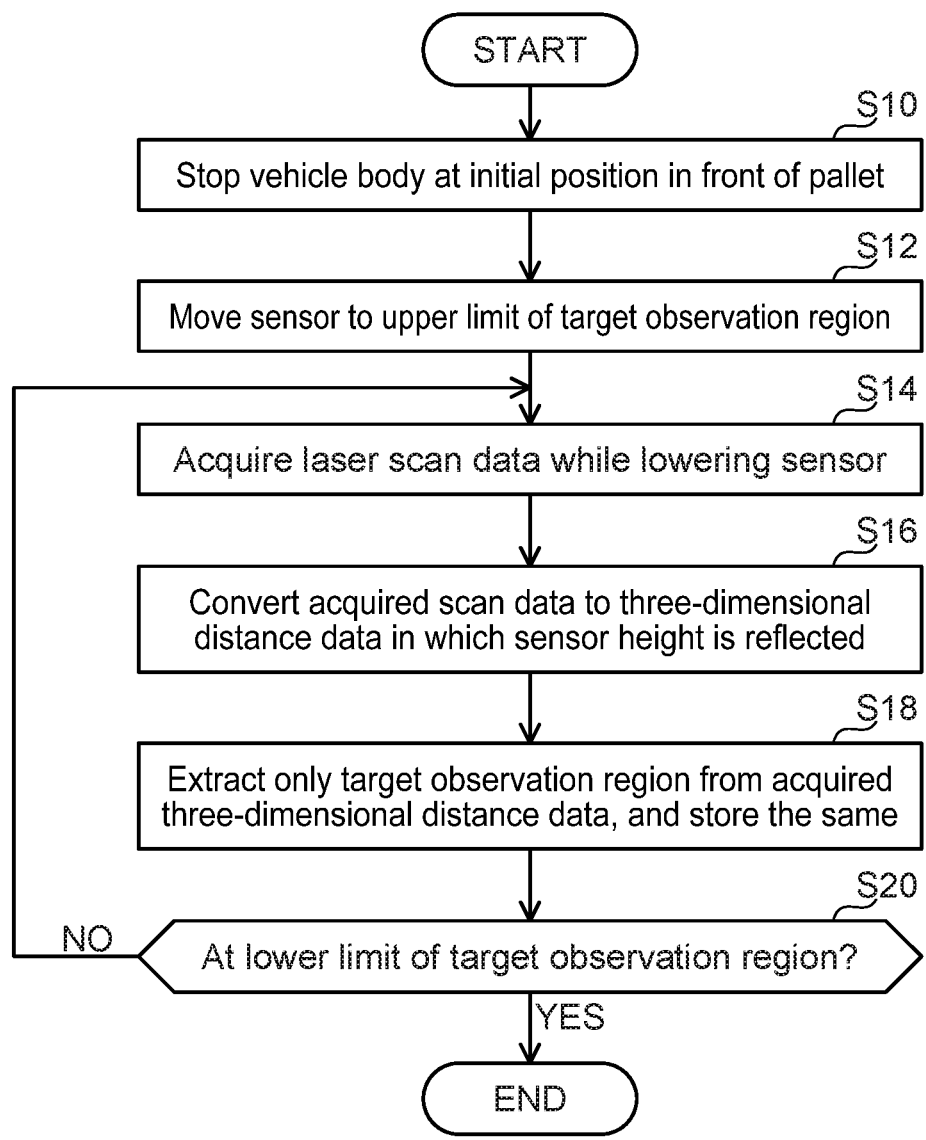
FIG. 4 is a flowchart showing procedures of a process of acquiring a three-dimensional range image using a laser sensor.

Next, a process to generate three-dimensional distance data 42 by the controller 30 will be described. The three-dimensional distance data generating process is performed in a state where the forklift 10 is in standby in a vicinity of the pallet 100 to be lifted. That is, as shown in FIG. 4, the controller 30 firstly drives one of the rear wheels 29 and moves the forklift 10 to approach the pallet 100 so that the pallet 100 is located in front of the vehicle body 12. That is, the forklift 10 is moved to an initial position in front of the pallet to observe the pallet 100 using the laser sensor 20 (S10). For example, the forklift 10 that conveys loads within a factory has preset positions for lifting the loads (the pallet 100). Due to this, the initial position for the forklift 10 to be in standby is preset with respect to the position where the pallet 100 is to be lifted. Due to this, the controller 30 causes the forklift 10 to move autonomously to the preset 26 initial position. It should be noted that, in a case where the forklift 10 is to be driven by a driver personnel, the forklift 10 may be moved to the initial position by the driver personnel, and thereafter the three-dimensional distance data generating process may be started by a switch operation by the driver personnel on the forklift 10.

Figure 5:
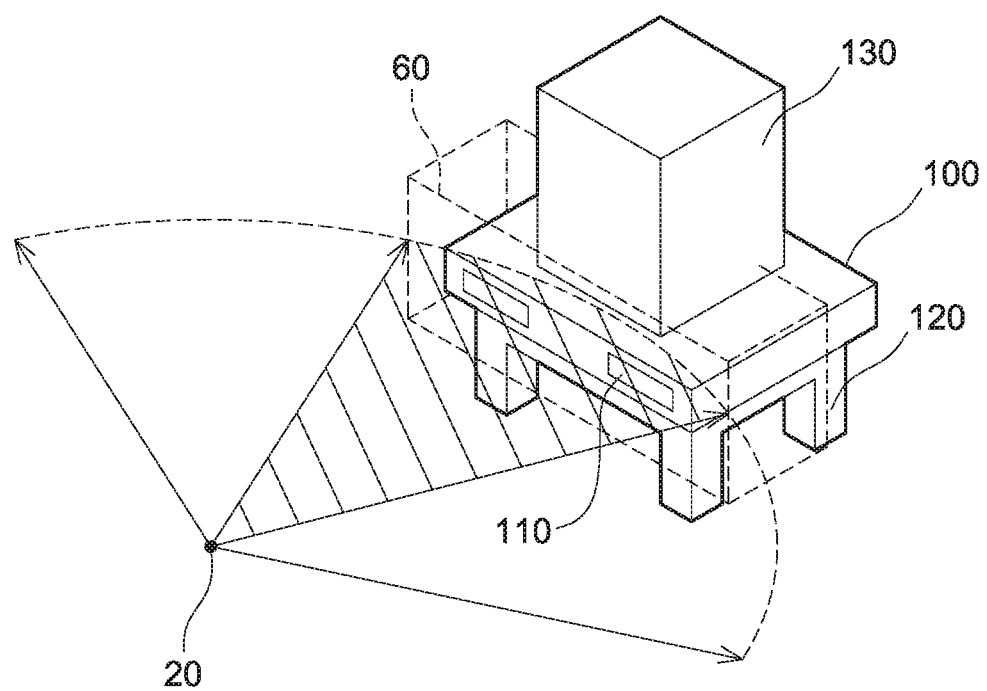
FIG. 5 is a diagram showing a state in which distance data from the laser sensor to a pallet is being acquired by the laser sensor.

Next, the controller 30 moves the laser sensor 20 by using the fork lifting device 40 so that the laser light is emitted to an upper limit of a target observation region 60 (shown in FIG. 5) (S12). The target observation region 60 is a region where the pallet 100 may be existing. For example, as shown in FIG. 5, in a case where a package 130 is mounted on the pallet 100, and the pallet 100 is mounted on a stage 120, the region where the pallet 100 may be existing (height and width thereof) is determined by sizes of the stage 120 and the pallet 100. In step S12, the laser sensor 20 is moved to the upper limit of the region where the pallet 100 may be existing, so that the pallet 100 can surely be detected.

Next, the controller 30 acquires distance data 41 using the laser sensor 20 while lowering the fork 22 using the fork lifting device 40 (S14). That is, the laser sensor 20 scans and emits the laser light along the horizontal direction, while at the same time detects reflection of the emitted laser light. On the other hand, since the fork lifting device 40 lifts and lowers the fork 22, the laser sensor 20 moves in the vertical direction. Due to this, the laser light emitted from the laser sensor 20 is scanned in a vertical direction as well. Accordingly, in the process of step S14, the laser light from the laser sensor 20 is scanned in both the horizontal and vertical directions, and detection of the reflections thereof allows an acquisition of observation point groups in the target observation region 60. It should be noted that, a function of the controller 30 realized by the aforementioned processes of steps S12 and S14 corresponds to the sensor moving controlling unit 38 shown in FIG. 3.

Next, the controller 30 converts the acquired distance data 41 to three-dimensional distance data 42 in which a height of the laser sensor 20 is reflected (S16). That is, since the controller 30 controls the fork lifting device 40 to lift and lower the fork 22, a position of the fork 22 in the vertical direction (a heightwise position of the laser sensor 20) can be identified. Due to this, when reflection is optically received in the laser sensor 20, the controller 30 reflects height information of the laser sensor 20 at the time of the optical reception to the distance data 41 (at the observation point) and converts it to the three-dimensional distance data 42. Due to this, the three-dimensional distance data 42 indicative of the object existing in the region 50 having the predetermined angular range where the laser light was emitted can be acquired. It should be noted that a function of the controller 30 realized by the process of step S16 as above corresponds to the coordinate converting unit 32 and the sensor position detecting unit 39 shown in FIG. 3.

Next, the controller 30 selectively extracts only an observation point group within the target observation region 60 from the acquired three-dimensional distance data 42, and stores the same in the memory (S18). Since the height of the laser sensor 20 is reflected in the three-dimensional distance data 42, the observation point group in the target observation region 60 at that height is stored in the memory. It should be noted that a function of the controller 30 realized by the process of step S18 as above corresponds to the calculating-storing unit 34 shown in FIG. 3.

Next, the controller 30 determines whether or not a current observing position (height) by the laser sensor 20 is at a lower limit of the target observation region 60 (S20). If it is determined that the current observing position is not at the lower limit of the target observation region (NO to S20), the controller 30 repeats the processes of steps S14 to S18. It should be noted that, if it is determined that the current observing position is at the lower limit of the target observation region (YES to S20), the controller 30 completes the process.

By repeatedly performing the aforementioned processes, the observation point groups (three-dimensional distance data 42) for an entirety of the target observation region 60 can be stored in the memory, as a result of which the three-dimensional range image 44 in the target observation region 60 can thereby be generated.

Figure 6:
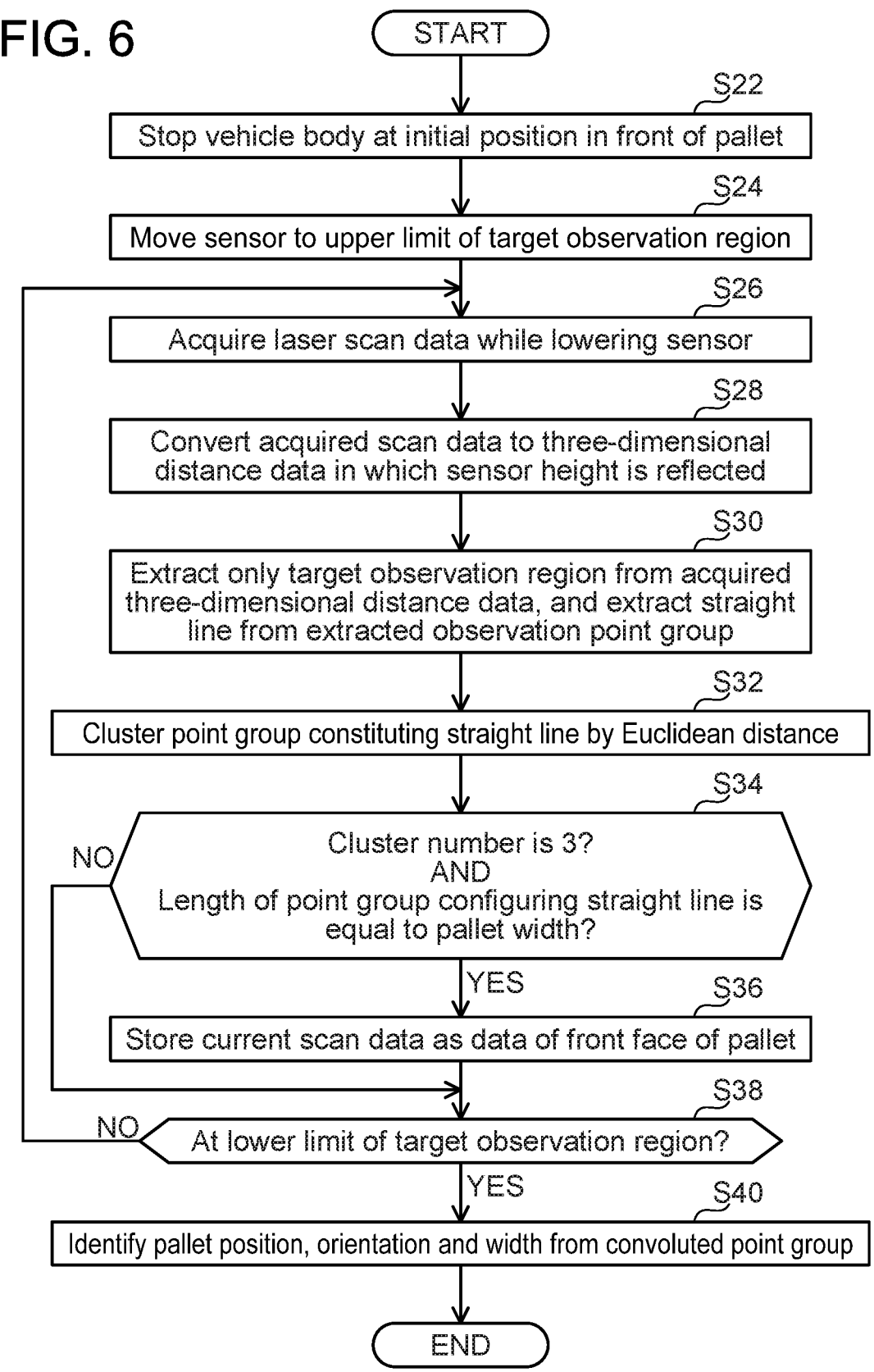
FIG. 6 is a flowchart showing procedures of a process of identifying a position, orientation, and width of the pallet.
Figure 7:
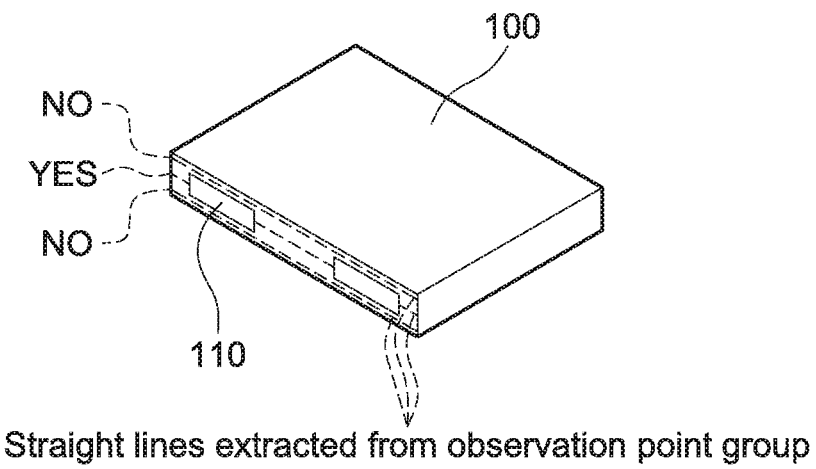
FIG. 7 is a diagram for explaining a method of detecting openings of the pallet.

Next, the process of identifying the position, orientation, and width of the pallet 100 will be described with reference to FIGS. 6 and 7. Firstly, the controller 30 drives the one of the rear wheels 29 to cause the forklift 10 to approach the pallet 100 so that the pallet 100 is located in front of the vehicle body 12. That is, the controller 30 moves the forklift 10 to the initial position in front of the pallet so as to observe the pallet 100 using the laser sensor 20 (S22). Next, the controller 30 moves the laser sensor 20 by using the fork lifting device 40 so that the laser light is emitted to an upper limit of the target observation region 60 (shown in FIG. 5) (S24). Next, the controller 30 acquires distance data 41 using the laser sensor 20 while lowering the fork 22 using the fork lifting device 40 (S26). Then, the controller 30 converts the acquired distance data 41 to three-dimensional distance data 42 in which the height of the laser sensor 20 is reflected (S28). It should be noted that, since the processes of steps S22 to S28 are same as the processes of steps S10 to S16 as aforementioned, the detailed description thereof will be omitted.

Next, the controller 30 selectively extracts the observation point group in the target observation region 60 from the three-dimensional distance data 42, and a straight line extending in a substantially horizontal direction is extracted from the observation point group that has been extracted (S30). As shown in FIG. 7, the observation point group constituted of reflection that is reflected on the front face of the pallet 100 is located on a single plane. That is, in step S30, the straight line, which is a resultant from scanning the front face of the pallet 100, is extracted from the observation point group. It should be noted that, the extraction of the straight line can use well-known algorithms called robust estimation, such as RANSAC.

Next, the controller 30 clusters the point group constituting the extracted straight line (matching the straight line) by using Euclidean distances (S32). Here, as shown in FIGS. 5 and 7, the front face of the pallet 100 has two openings 110 (into which the tines 22a, 22b of the fork 22 are to be inserted). Due to this, the straight line extracted from the front face of the pallet 100 may be divided by the openings 110 in the front face of the pallet 100. Thus, a determination on whether or not the straight line is extracted from a single object (for example, from the front face of the pallet 100) is made using Euclidean distances in the point group constituting the straight line extracted in step S30. It should be noted that, for this clustering, well-known methods such as k-means method or kd-tree method may be used.

Next, the controller 30 performs a process of step S34. Specifically, the controller 30 firstly counts a number of straight line groups that had been clustered (that is a number of clusters), and determines whether or not the counted number of clusters is three (S34). As aforementioned, at a position (height) in the front face of the pallet 100 where the openings 110 are provided, the straight line extending in the substantially horizontal direction (the observation point group) is divided into three by the openings 110 in a laser light horizontal scan (YES to S34). Accordingly, in step S34, a determination can be made on whether or not the extracted straight line corresponds to the front face of the pallet 100 by determining the cluster number is three or not.

Figure 8:
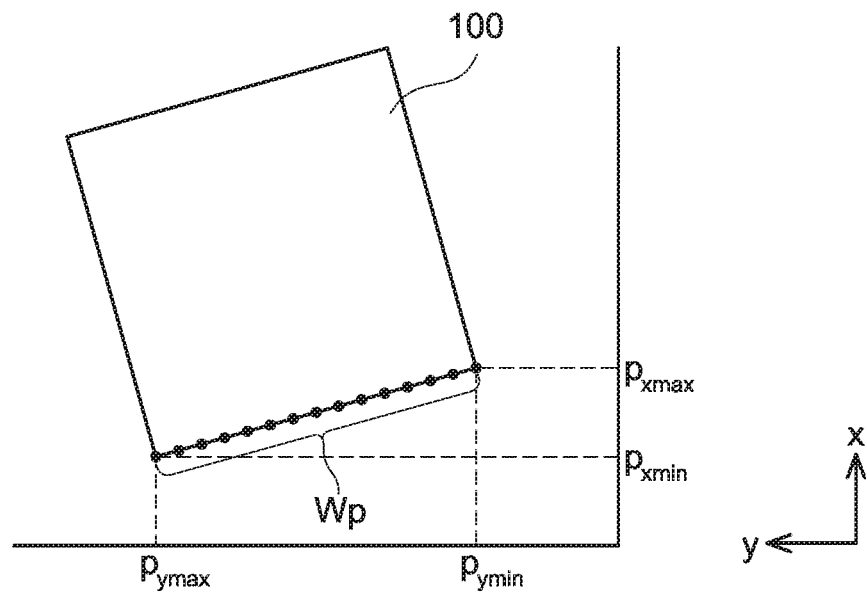
FIG. 8 is a diagram for explaining a method of calculating a length of a point group configuring a straight line extracted from acquired three-dimensional distance data.

Next, the controller 30 determines whether or not a length of the point group configuring the straight line extracted in step S30 is substantially equal to the width of the pallet 100 (S34). Here, a standard of the pallet 100 is normally known in advance. Thus, a determination can be made on whether or not the straight line on the front surface of the pallet 100 is being extracted by comparing the length of the point group configuring the extracted straight line and a preset value (a value set from the standard of the pallet 100). A length $W_p$ of the point group configuring the extracted straight line may be obtained by using observation points having maximal and minimal values along an x direction and maximal and minimal values along a y direction within the point group as for example shown in FIG. 8. The controller 30 determines whether or not the obtained length is equal to the width of the pallet 100 by comparing it with the width of the pallet 100 (preset value).

In the process of step S34 as aforementioned, if one or more of the conditions are not met (NO to S34), the controller 30 terminates the process on the point group constituting the extracted straight line, and proceeds to a process of step S38. If all of the conditions in the 265 process of step S34 are met (YES to S34), the controller 30 stores the point group constituting the straight line as data that was obtained by observing the front face of the pallet 100 (S36).

Next, the controller 30 determines whether or not a current observing position (height) of the laser sensor 20 is at a lower limit of the target observation region 60 (S38). Since the controller 30 controls the fork lifting device 40 to lift and lower the fork 22, it is capable of identifying a position of the fork 22 in the vertical direction. Since the laser sensor 20 is mounted on the fork 22, the controller 30 (the sensor position detecting unit 39 shown in FIG. 3) is capable of identifying a heightwise position of the laser sensor 20. If the current observing position (height) is at the lower limit of the target observation region 60 (YES to S38), the controller 30 identifies a position, orientation, and width of the pallet 100 from the stored observation point group (the three-dimensional range image 44, which may hereinbelow be termed a convoluted point group) (S40). That is, a straight line group having the cluster number of three, and in which a length of the point group constituting the straight line was determined as being equal to the width of the pallet 100 is obtained from a heightwise range of the front face of the pallet 100 where the openings 110 are provided. In step S40, the position, orientation, and width of the pallet 100 are identified using the data of the observation point group constituting such a straight line group. A process of step S40 will be described in detail below. It should be noted that, if the current observing position (height) is not at the lower limit of the target observation region 60 (NO to S38), the controller 30 returns to the process of step S24.

Figure 9:
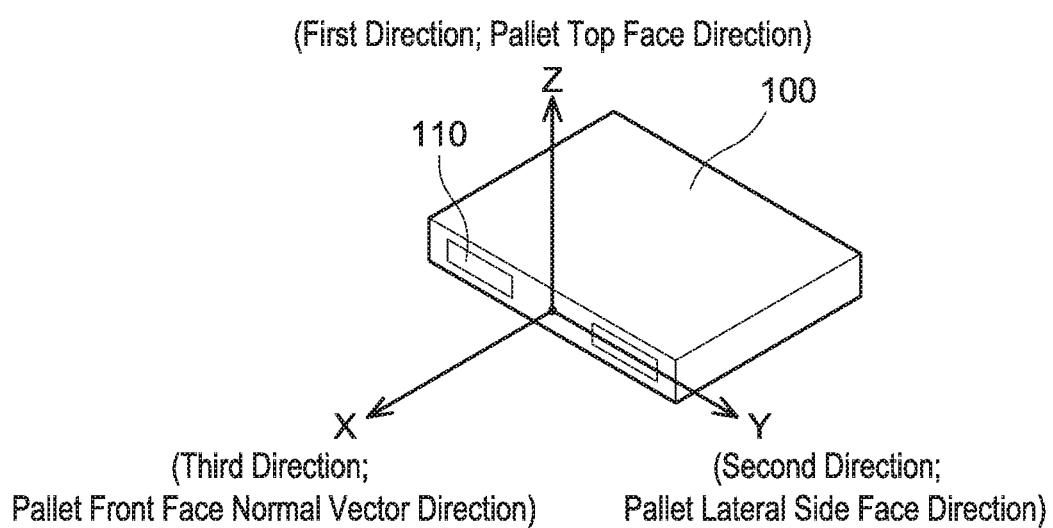
FIG. 9 is a diagram showing the pallet and coordinate axes set to the pallet together.

Next, a method of identifying the position, orientation, and width of the pallet 100 in step S40 will be described. Firstly, a variance-covariance matrix as in the following formula (1) will be considered to obtain main axes (that is, an x axis, a y axis, and a z axis shown in FIG. 9) from variations of respective points $(x_i, y_i, z_i)$ (i=1 to N) in N sets of convoluted point groups.

[Math 1]

$$\frac{1}{N}\sum_i^N \begin{pmatrix} (x_i-\bar{x})^2 & (x_i-\bar{x})(y_i-\bar{y}) & (x_i-\bar{x})(z_i-\bar{z}) \\ (x_i-\bar{x})(y_i-\bar{y}) & (y_1-\bar{y})^2 & (y_i-\bar{y})(z_i-\bar{z}) \\ (x_i-\bar{x})(z_i-\bar{z}) & (y_i-\bar{y})(z_i-\bar{z}) & (z_i-\bar{z})^2 \end{pmatrix} \quad (1)$$

In the above formula (1), an x bar, a y bar, and a z bar respectively represent averages of coordinates of N sets of points $x_i, y_i, z_i$, and represent a center of the front face of the pallet 100.

Next, an eigenvector in a three-dimensional space is calculated from this matrix. A first main axis of this eigenvector corresponds to a vector of the pallet in a lateral side face direction (the y axis in FIG. 9), a second main axis corresponds to a vector of the pallet in a top face direction (the z axis in FIG. 9), and a third main axis corresponds to a normal vector of the front face of the pallet (the x axis in FIG. 9). According to this, the position and orientation of the pallet in a coordinate system defining its origin at the center of the front face of the pallet are identified. It should be noted that, since the direction of the eigenvector representing the main axes may have its positive and negative directions inverted depending on cases, it is preferable to adjust signs thereof according to its relative relationship with the laser sensor 20.

Here, a size and width of the pallet 100 can be obtained by projecting the convoluted point group in a plane defined by the first and second main axes of the aforementioned eigenvector. Specifically, a difference between maximal and minimal values of the projection on the first main axis (y axis) corresponds to the width of the pallet 100, and a difference between maximal and minimal values of the projection on the second main axis (z axis) corresponds to a heightwise dimension of the openings 110 of the pallet 100. That is, the size and width of the pallet 100 can thereby be identified. Due to this, the position, orientation, and width of the pallet 100 can be identified. Further, averages of the maximal values and the minimal values of the respective projections of the convoluted point group to respective planes defined by the first, second, and third main axes may be set as the center point of the pallet 100. It should be noted that a function of the controller 30 realized by the above process of step S40 corresponds to the pallet identifying unit 36 shown in FIG. 3.

In the forklift 10 of the aforementioned embodiment, the laser sensor 20 is mounted to the fork 22. Due to this, the laser sensor 20 moves up and down as the fork 22 moves up and down. As such, the three-dimensional range image of the pallet 100 can be acquired simply by allowing the laser sensor 20 to scan the laser light in the horizontal direction while moving the fork 22 up and down. Further, since the position, orientation, and width of the pallet 100 are identified using the three-dimensional range image of the pallet 100, a positional displacement in a lateral direction and a displacement related to rotation of the pallet 100 can be detected. As a result, interference between the fork 22 and the pallet 100 can be prevented, and smooth loading operation is thereby enabled.

Further, in the forklift 10 of the present embodiment, a determination can be made on whether or not a load is mounted on the pallet 100 using the laser sensor 20, and further, a position of the load on the pallet 100 can be identified. Due to this, it can be recognized in advance if the load is mounted on the pallet 100 at an unbalanced position, so preventive measures can be taken against the load falling off of the pallet 100. Further, since a shape of the load on the pallet 100 can be identified, a type of the load can also be identified.

Finally, corresponding relationships between the aforementioned embodiment and the claims will be described. The fork lifting device 40 is an example of "moving mechanism" in the claims, and the calculating-storing unit 34 and the pallet identifying unit 36 are an example of "processor" in the claims.

The embodiments have been described in detail, however, these are mere exemplary indications and thus do not limit the scope of the claims. The art described in the claims include modifications and variations of the specific examples presented above.

Figure 10:
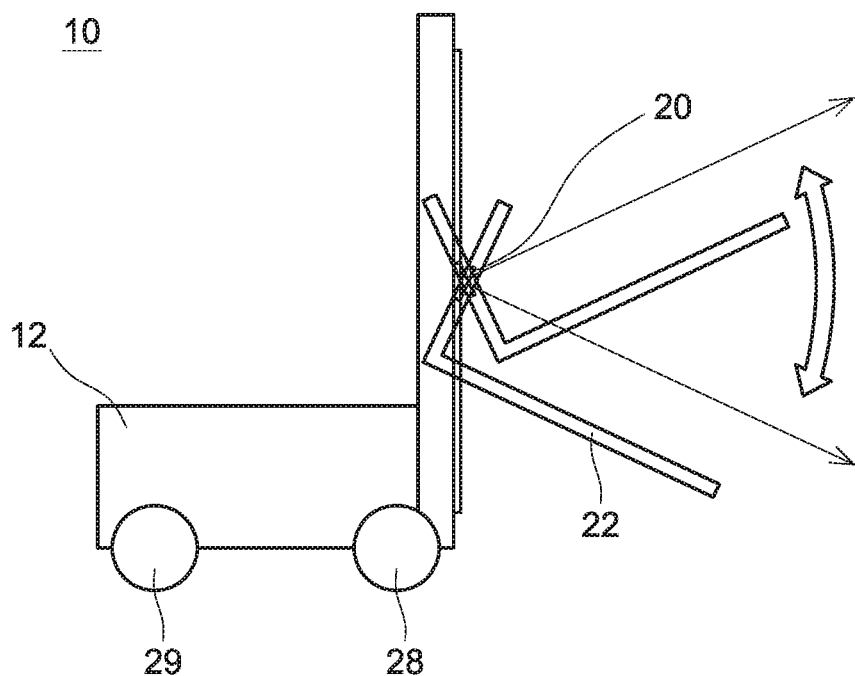
FIG. 10 is a diagram schematically showing a state in which laser light is scanned by using a tilting mechanism configured to tilt a fork.

For example, in the present embodiment, the laser light is scanned in the vertical direction by moving the fork up and down in the vertical direction, however, the technique disclosed herein is not limited to this configuration. For example, as shown in FIG. 10, the laser light emitted from the laser sensor 20 may be scanned in the vertical direction by using a tilting mechanism that tilts a distal end of the fork with respect to its proximal end.

Figure 11:
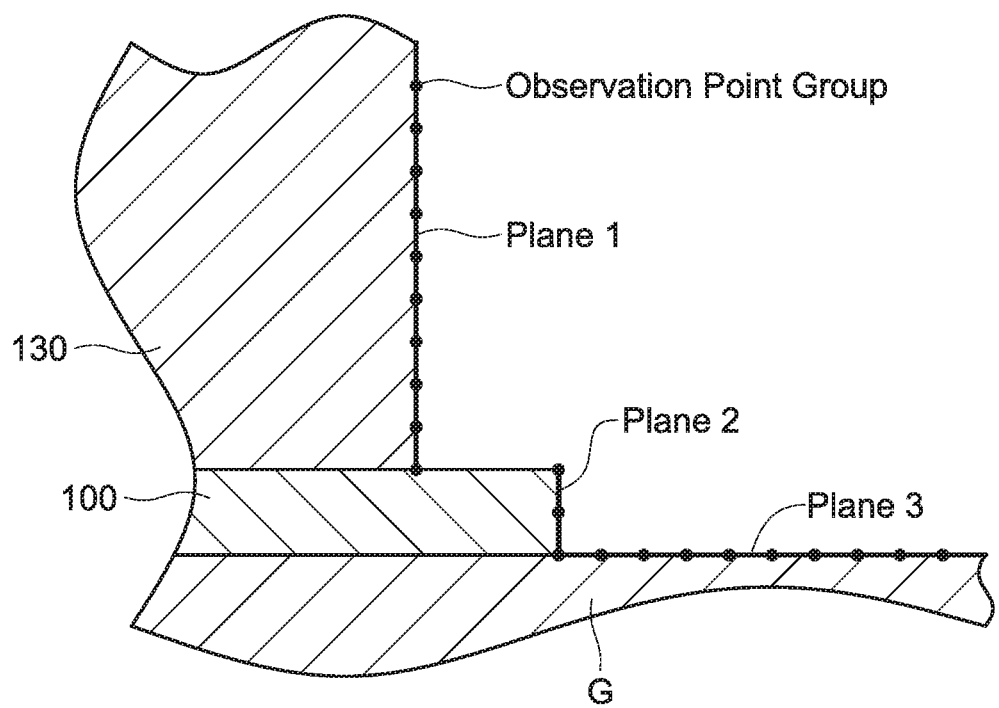
FIG. 11 is a diagram for explaining a process of identifying a pallet front face from the three-dimensional range image.

Further, in the present embodiment, the pallet 100 is detected by extracting straight lines from the observation point groups obtained using the laser sensor 20, however, the technique disclosed herein may directly extract a plane of the front face of the pallet 100 from the observation point groups obtained using the laser sensor 20. For example, as shown in FIG. 11, when the pallet 100 is directly placed on a floor surface G and a load 130 is mounted on the pallet 100, a front face of the load 130 (plane 1), the front face of the pallet 100 (plane 2), and the floor surface G (plane 3) may be extracted using the laser sensor 20. Due to this, the position, orientation, and width of the pallet 100 can be identified by performing the process of step S40 shown in FIG. 6 on the observation point groups constituting the front face of the pallet 100 (plane 2). It should be noted that for the plane extraction, the RANSAC algorithm can be used similar to the straight line extraction in step S30 of FIG. 6.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A forklift comprising:
   a fork;
   a moving mechanism comprising a lifting mechanism configured to move the fork up and down in a vertical direction;
   a laser sensor mounted on the fork so as to move up and down in the vertical direction as the fork moves up and down in the vertical direction, wherein the laser sensor is configured to scan laser light in a scanning direction intersecting the vertical direction, and measure a distance from the laser sensor to a pallet based on reflection of the scanned laser light; and
   a processor programmed to:
   generate a three-dimensional range image within an emission range to which the laser light is emitted based on distance data acquired when the laser sensor scans the laser light in the scanning direction while the moving mechanism moves the fork in the vertical direction,
   wherein
   the processor is programmed to:
   (a) acquire an observation point group from three-dimensional distance data acquired from the laser sensor;
   (b) extract a point group constituting a straight line extending in a substantially horizontal direction from the observation point group;
   (c) cluster the point group constituting the extracted straight line by using Euclidean distance;
   (d) determine whether or not a number of clusters of the extracted straight line equals three and determine whether or not a length of the point group constituting the extracted straight line is substantially equal to a width of the pallet; and
   (e) based upon (i) the number of clusters of the extracted straight line equaling three and (ii) the length of the point group being substantially equal to the width of the pallet, store the point group constituting the straight line as the three-dimensional distance data of a front face of the pallet,
   (f) when the generated three-dimensional range image includes the pallet, selectively extract only the three-dimensional distance data acquired from the front face of the pallet from the three-dimensional range image and identify a position, an orientation, and the width of the pallet based on a plane at the front face of the pallet identified based on the extracted distance data.

2. The forklift according to claim 1, wherein
the moving mechanism further comprises a tilting mechanism configured to tilt a distal end of the fork with respect to a proximal end of the fork, and
the laser light emitted from the laser sensor is scanned in the vertical direction as the distal end of the fork tilts with respect to the proximal end of the fork.

* * * * *